(12) United States Patent
Guzman

(10) Patent No.: US 10,584,580 B2
(45) Date of Patent: Mar. 10, 2020

(54) ELECTROMAGNETIC SURFACE WAVE COMMUNICATION IN A PIPE

(71) Applicant: SharpKeen Enterprises, Inc., Lehi, UT (US)

(72) Inventor: Joel Guzman, Lehi, UT (US)

(73) Assignee: Sharpkeen Enterprises, Inc., Lehi, UT (US)

( * ) Notice: Subject to any disclaimer, the term of this patent is extended or adjusted under 35 U.S.C. 154(b) by 0 days.

(21) Appl. No.: 16/168,738

(22) Filed: Oct. 23, 2018

(65) Prior Publication Data

US 2019/0120046 A1    Apr. 25, 2019

Related U.S. Application Data

(60) Provisional application No. 62/575,941, filed on Oct. 23, 2017.

(51) Int. Cl.

| | |
|---|---|
| *E21B 47/12* | (2012.01) |
| *E21B 17/00* | (2006.01) |
| *H01P 3/16* | (2006.01) |
| *E21B 17/02* | (2006.01) |
| *G01V 3/30* | (2006.01) |
| *H01P 3/12* | (2006.01) |
| *H01P 3/123* | (2006.01) |
| *G01V 11/00* | (2006.01) |

(52) U.S. Cl.
CPC .......... *E21B 47/122* (2013.01); *E21B 17/003* (2013.01); *E21B 17/006* (2013.01); *E21B 17/028* (2013.01); *G01V 3/30* (2013.01); *G01V 11/002* (2013.01); *H01P 3/122* (2013.01); *H01P 3/123* (2013.01); *H01P 3/16* (2013.01)

(58) Field of Classification Search
CPC .... E21B 17/003; E21B 17/006; E21B 17/028; E21B 47/122; G01V 3/30; G01V 11/002; H01P 3/122; H01P 3/123; H01P 3/16
See application file for complete search history.

(56) References Cited

U.S. PATENT DOCUMENTS

| | | | |
|---|---|---|---|
| 3,345,590 A | 10/1967 | Wolfgang et al. | |
| 7,400,262 B2 * | 7/2008 | Chemali | E21B 17/028 340/853.1 |

(Continued)

OTHER PUBLICATIONS

United States Patent and Trademark Office, "International Search Report", dated Jan. 25, 2019, International Application No. PCT/US2018/057162.

(Continued)

*Primary Examiner* — Franklin D Balseca
(74) *Attorney, Agent, or Firm* — Terrence J. Edwards; TechLaw Ventures, PLLC

(57) ABSTRACT

Systems, methods, and devices for a single-line transmission along a plurality of pipes secured end-to-end are disclosed. A system of the disclosure includes a plurality of pipes connected end-to-end forming a pipe string. Each pipe of the plurality of pipes includes an exterior wall, an internal protective coating, and a waveguide. The waveguide for each pipe of the plurality of pipes is connected to at least one other waveguide for at least one other pipe such that a wave path is formed that extends a length of the plurality of pipes. The system further includes a transceiver configured to transmit a signal along the wave path.

20 Claims, 13 Drawing Sheets

(56) References Cited

U.S. PATENT DOCUMENTS

| | | | |
|---|---|---|---|
| 9,640,850 B2 | 5/2017 | Henry et al. | |
| 9,715,031 B2* | 7/2017 | Contant | G01V 3/30 |
| 10,132,160 B2* | 11/2018 | Roberson | E21B 47/122 |
| 2002/0021197 A1 | 2/2002 | Elco | |
| 2005/0001738 A1 | 1/2005 | Hall et al. | |
| 2005/0115717 A1 | 2/2005 | Hall et al. | |
| 2008/0247273 A1 | 10/2008 | Chemali et al. | |
| 2013/0186669 A1* | 7/2013 | Chabas | E21B 17/028 174/47 |
| 2015/0009040 A1* | 1/2015 | Bowles | E21B 47/122 340/854.6 |
| 2015/0086152 A1* | 3/2015 | Samson | G02F 1/29 385/8 |
| 2015/0285066 A1 | 10/2015 | Keller et al. | |
| 2016/0115783 A1 | 4/2016 | Zeng et al. | |
| 2017/0170540 A1 | 6/2017 | Morgan et al. | |

OTHER PUBLICATIONS

Trent Jacobs, "These Are the Forks in the Road to Drilling Automation", Journal of Petroleum Technology, May 23, 2017, https://www.spe.org/en/jpt/jpt-article-detail/?art=3002, vol. 69, Issue 7.

* cited by examiner

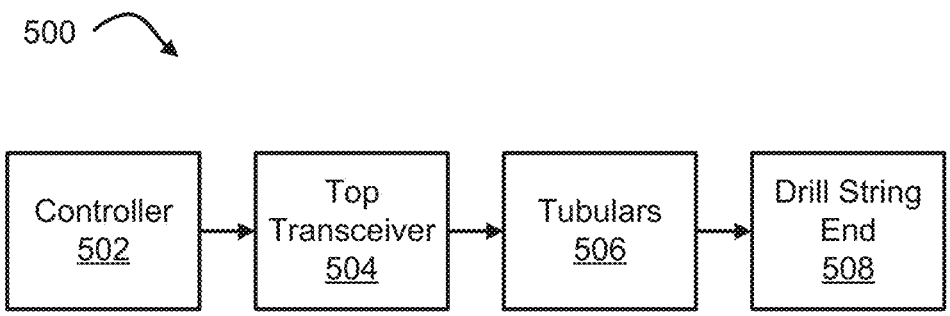
FIG. 5
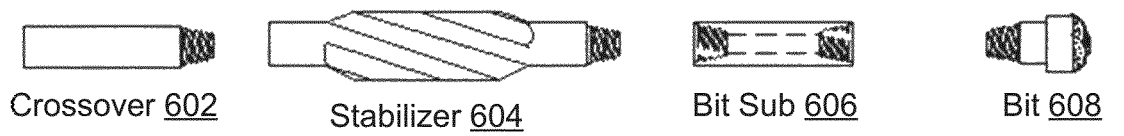
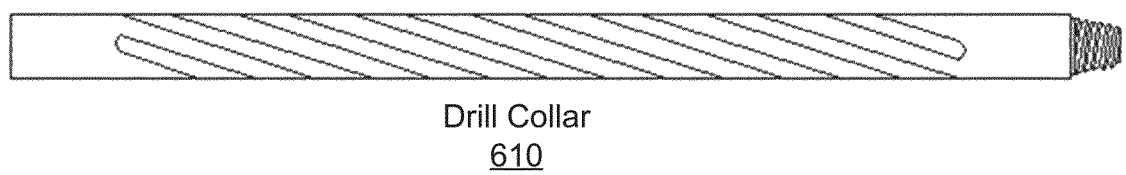
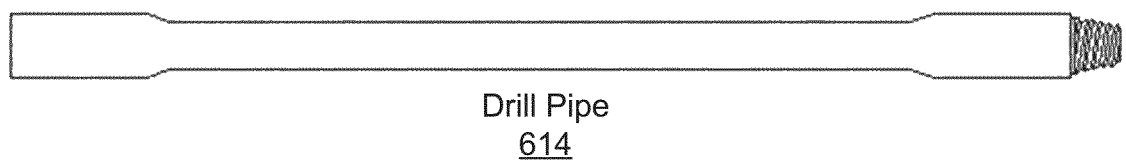
FIG. 6

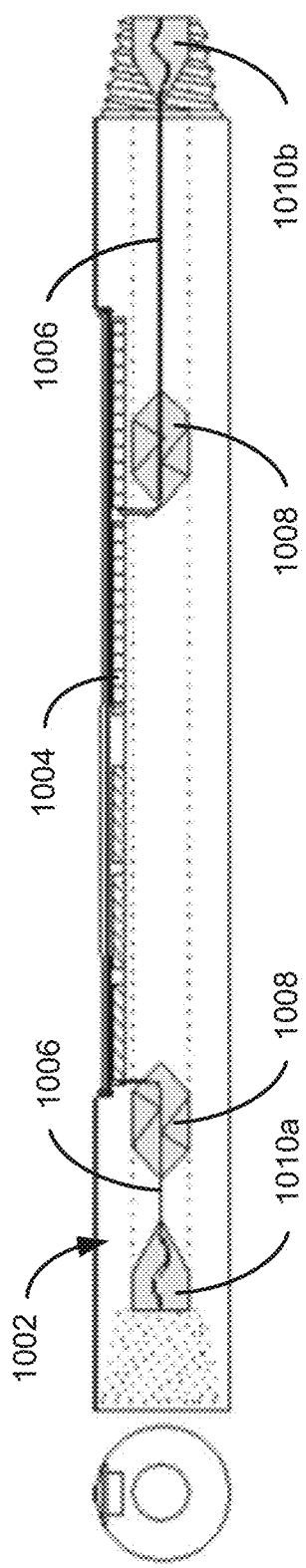
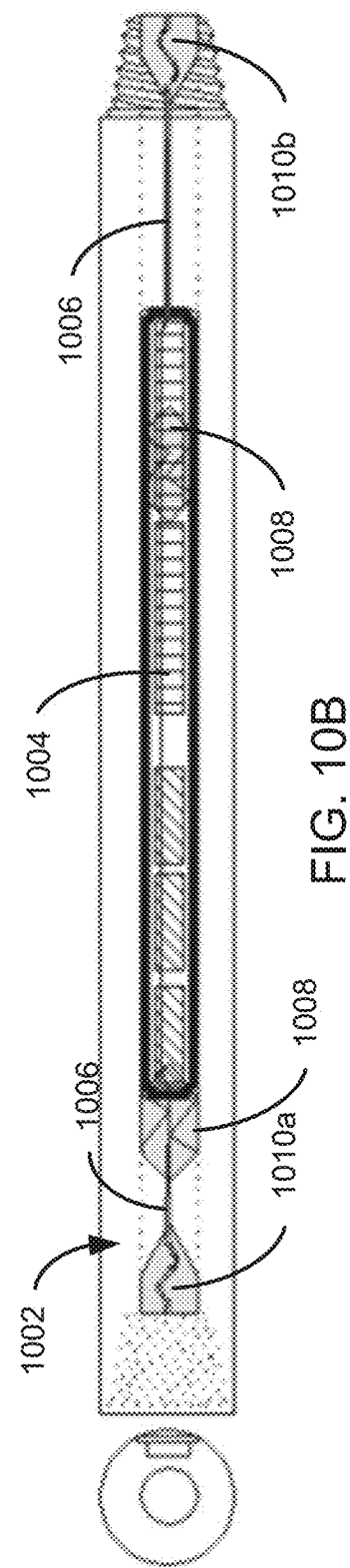

ELECTROMAGNETIC SURFACE WAVE COMMUNICATION IN A PIPE

CROSS-REFERENCE TO RELATED APPLICATIONS

This application claims the benefit under 35 U.S.C. § 119(e) of U.S. Provisional Patent Application No. 62/575,941 filed Oct. 23, 2017 and titled "ELECTROMAGNETIC WAVE COMMUNICATION IN A PIPE," which is incorporated herein by reference in its entirety, including but not limited to those portions that specifically appear hereinafter, the incorporation by reference being made with the following exception: In the event that any portion of the above-referenced application is inconsistent with this application, this application supersedes said above-referenced application.

STATEMENT REGARDING FEDERALLY SPONSORED RESEARCH OR DEVELOPMENT

Not applicable.

TECHNICAL FIELD

The present disclosure relates to systems, methods, and devices for communication along a pipe or pipe chain and more particularly relates to systems, methods, and devices for electromagnetic wave communication in a downhole pipe chain.

BACKGROUND

Oil rigs can be exceptionally dangerous places to work. Over the last several decades, oil rig explosions have been responsible for numerous environmental disasters, worker injuries, and worker deaths. Oil rig automation provides significant productivity benefits and can prevent or reduce oil rig accidents and any associated injuries to oil rig workers. The automation of an oil rig requires the use of monitoring systems. Such monitoring systems may use a variety of sensors that are located deep beneath the surface and must communicate with a device above-ground.

Automated monitoring systems provide significant benefits to the drilling industry. The reliance on automated monitoring systems can provide an improved means to predict and stop oil rig accidents before they occur. However, such automated monitoring systems known in the art have many limitations. Systems, methods, and devices for improved surface wave communication in a drill pipe are disclosed herein.

BRIEF DESCRIPTION OF THE DRAWINGS

FIG. 5 illustrates a system for drill string communication, according to one embodiment;

FIG. 6 illustrates example drill string components, according to one embodiment;

FIG. 10A is a schematic side view of a drill pipe or other tubular member with a built-in transceiver and a plurality of spring metal sheets, according to one embodiment;

FIG. 10B is a schematic cross-sectional side view of a drill pipe or other tubular member with a built-in transceiver and a plurality of spring metal sheets, according to one embodiment;

DETAILED DESCRIPTION

Figure 1:
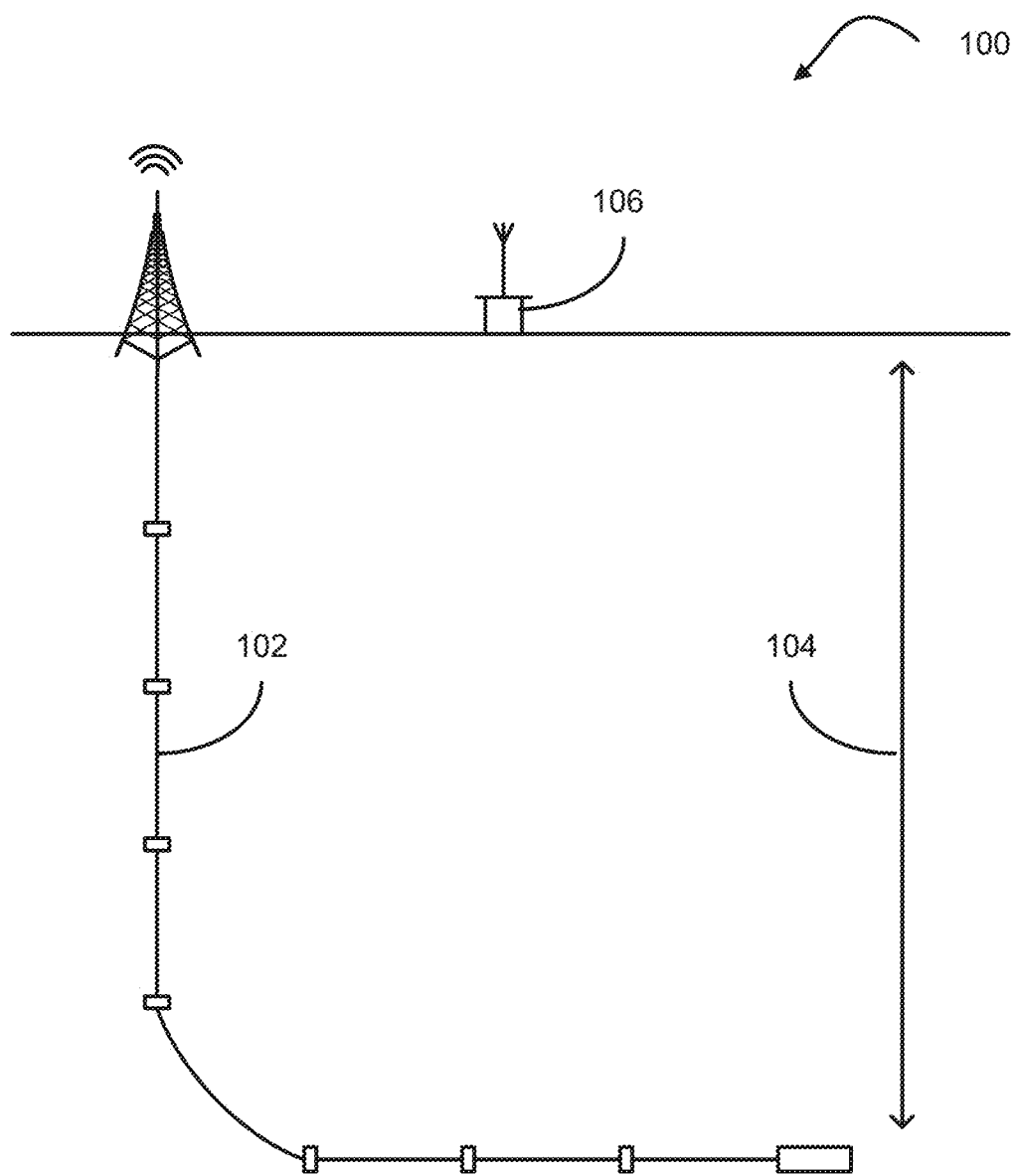
FIG. 1 is a schematic diagram illustrating an example oil rig with drill string.

The systems, methods, and devices described herein provide a new means for conducting communications and transmissions in a downhole pipe, such as a drill pipe utilized in an oil or gas drilling rig. Automated drilling is on the rise, but the communication networks and systems for controlling automated drilling have severe limitations. Such communications can be exceptionally slow and require significant upkeep. In an embodiment known in the art, a coaxial cable may be run down the hollow shaft of a drill string and the coaxial cable may undergo significant wear and tear caused by drilling operations. In further embodiments, significant modifications may be made to drilling pipes to enable communication lines to travel downhole. Such modifications can be costly and require extensive upkeep.

The drilling of oil and gas wells can be exceptionally dangerous. Oil rig explosions can cause severe environmental disasters and cause injury or death for oil rig workers. Numerous components of an oil rig can fail and cause devastating consequences if the oil rig is not shut off or the component is not quickly repaired or replaced. Monitoring systems can be installed on oil rig components so that workers can receive a prewarning of a possible deteriorating condition of an oil rig component. Essential machinery in an oil rig must be constantly monitored to prevent an explosion or other disaster and to maintain awareness of the life expectancy of oil rig components.

Monitoring equipment used for oil and gas drilling can detect numerous problems, including for example, rolling element bearing damages, gear wear and damage, imbalance, misalignment in shafts and gears, looseness, structural resonances, motor rotor and shaft eccentricity, and electrical motor problems. Often, such monitoring equipment includes sensors located deep beneath the surface that must communicate with above-ground devices. The communication capabilities for such monitoring systems known in the art have many limitations.

Communications between above-ground devices and underground monitoring sensors can be very slow. For example, wireless communications from underground locations such as mud-pulse, ultrasound, and magnetic flux telemetry methods are very slow (around 40 bits per second) and typically require the stopping of all drilling activity to get a reading. A leading wired technique is high-speed telemetry through coaxial transmission lines and inductive couplers which may provide speeds of up to 56 Kbps using a 5 MHz signal. However, this technology is not financially practical because it requires expensive modifications to the drill string components. Other hardwired devices are also used (wire-line devices), but they also present their own set of drawbacks such as the need to drop the device downhole through the top of the well. The wireless methods mentioned above require the use of batteries, which in turn, require frequent replacement due to the extreme underground environment.

Numerous methods have been attempted to improve communications with oil rig monitoring systems. One such method includes transmitting through the drill pipe itself, but the permeability of the steel material used in drill pipe does not permit using the pipe itself as a conductor of Radio Frequencies (RF) or any frequencies above Radio. This has dissuaded manufacturers and operators in the industry from using the drill pipe as a conductor for signal or for power communications. The challenges associated with using the drill pipe as a transmission line are compounded by the downhole environment that greatly impedes wireless signal transmissions within short distances.

Further challenges faced in the oil drilling industry arising from the coupling methods utilized from component to component within a string of drilling components. Such coupling methods include, for example, direct contact, inductive, capacitive, acoustic, piezoelectric, and so forth. The coupling methods introduce additional signal constraints such as wire insertion losses, band-pass filtering, scatter waves, and signal distortion. The additional signal constraints limit the frequency of a signal carrier and the volume of data traffic that may be carried. This is compounded by the integrity of the mechanical connection between coupled devices that requires a high number of signal restorers or conditioners within the string.

Systems, methods, and devices for improving downhole communications are disclosed herein. Embodiments disclosed herein overcome the above challenges and obstacles by converting conventional drill pipe and other string components to act as a single wire transmission medium (in essence an electro-magnetic waveguide) that, in conjunction with specially designed transceivers using modern communication technologies (such as in smart phone and other portable devices' technology), form a system in a drill string to transmit communication signals and/or power up or down hole. The systems, methods, and devices disclosed herein eliminate the need for special transmission lines, electrical connectors or contacts, inductive or capacity couples, or seals between string components.

In contrast with the conventional way a transmission line is utilized where the signal is expected to travel throughout the body of an electrical conductor and requiring a return path, the present disclosure leverages the natural phenomena of "Skin Effect" at high frequencies where the electromagnetic signal travels within the gap of two adjacent bodies with different dielectric characteristics without the need of an electrical return path. A very broad spectrum of frequencies, for example 100 MHz to 300 GHz, can be transmitted bidirectionally and processed this way. This permits the systems disclosed herein to implement modern modulation techniques such as phase shifting keying, quadrature amplitude modulation, multi-carrier modulation, orthogonal frequency division multiplexing and use multiple access techniques. Protocols and applications that could be processed by this system can include telephone, video, voice and data, WIFI, 802.xx, satellite, cable, ethernet, telemetry, and others. Additionally, the systems disclosed herein can be utilized to transmit power signals to remote devices downhole where a signal may be processed by resonant circuits to generate power. The generated power may drive motors or charge capacitors or batteries as needed. In the systems, methods, and devices disclosed herein, a plurality of signals having a variety of different purposes may use the same single waveguide.

U.S. Pat. No. 9,640,850 to Henry et al. titled "METHODS AND APPARATUS FOR INDUCING A NON-FUNDAMENTAL WAVE MODE ON A TRANSMISSION MEDIUM" discloses a system for generating first electromagnetic waves and directing instances of the first electromagnetic waves to an interface of a transmission medium to induce propagation of second electromagnetic waves having at least a dominant non-fundamental wave mode. U.S. Pat. No. 9,640,850 is hereby incorporated by reference in its entirety within the present application. The following paragraphs are an excerpt from column 4 line 16 through column 7 line 16 of U.S. Pat. No. 9,640,850.

"In an embodiment, a guided wave communication system for sending and receiving communication signals such as data or other signaling via guided electromagnetic waves. The guided electromagnetic waves include, for example, surface waves or other electromagnetic waves that are bound to or guided by a transmission medium. It will be appreciated that a variety of transmission media can be utilized with guided wave communications without departing from example embodiments. Examples of such transmission media can include one or more of the following, either alone or in one or more combinations: wires, whether insulated or not, and whether single-stranded or multi-stranded; conductors of other shapes or configurations including wire bundles, cables, rods, rails, pipes; non-conductors such as dielectric pipes, rods, rails, or other dielectric members; combinations of conductors and dielectric materials; or other guided wave transmission media."

"The inducement of guided electromagnetic waves on a transmission medium can be independent of any electrical potential, charge or current that is injected or otherwise transmitted through the transmission medium as part of an electrical circuit. For example, in the case where the transmission medium is a wire, it is to be appreciated that while a small current in the wire may be formed in response to the propagation of the guided waves along the wire, this can be due to the propagation of the electromagnetic wave along the wire surface, and is not formed in response to electrical potential, charge or current that is injected into the wire as part of an electrical circuit. The electromagnetic waves traveling on the wire therefore do not require a circuit to propagate along the wire surface. The wire therefore is a single wire transmission line that is not part of a circuit. Also, in some embodiments, a wire is not necessary, and the electromagnetic waves can propagate along a single line transmission medium that is not a wire."

"More generally, "guided electromagnetic waves" or "guided waves" as described by the subject disclosure are affected by the presence of a physical object that is at least a part of the transmission medium (e.g., a bare wire or other conductor, a dielectric, an insulated wire, a conduit or other hollow element, a bundle of insulated wires that is coated, covered or surrounded by a dielectric or insulator or other wire bundle, or another form of solid, liquid or otherwise non-gaseous transmission medium) so as to be at least partially bound to or guided by the physical object and so as to propagate along a transmission path of the physical object. Such a physical object can operate as at least a part of a transmission medium that guides, by way of an interface of the transmission medium (e.g., an outer surface, inner surface, an interior portion between the outer and the inner surfaces or other boundary between elements of the transmission medium), the propagation of guided electromagnetic waves, which in turn can carry energy, data and/or other signals along the transmission path from a sending device to a receiving device."

"Unlike free space propagation of wireless signals such as unguided (or unbounded) electromagnetic waves that decrease in intensity inversely by the square of the distance traveled by the unguided electromagnetic waves, guided electromagnetic waves can propagate along a transmission medium with less loss in magnitude per unit distance than experienced by unguided electromagnetic waves."

"Unlike electrical signals, guided electromagnetic waves can propagate from a sending device to a receiving device without requiring a separate electrical return path between the sending device and the receiving device. Consequently, guided electromagnetic waves can propagate from a sending device to a receiving device along a transmission medium having no conductive components (e.g., a dielectric strip), or via a transmission medium having no more than a single conductor (e.g., a single bare wire or insulated wire). Even if a transmission medium includes one or more conductive components and the guided electromagnetic waves propagating along the transmission medium generate currents that flow in the one or more conductive components in a direction of the guided electromagnetic waves, such guided electromagnetic waves can propagate along the transmission medium from a sending device to a receiving device without requiring a flow of opposing currents on an electrical return path between the sending device and the receiving device."

"In a non-limiting illustration, consider electrical systems that transmit and receive electrical signals between sending and receiving devices by way of conductive media. Such systems generally rely on electrically separate forward and return paths. For instance, consider a coaxial cable having a center conductor and a ground shield that are separated by an insulator. Typically, in an electrical system a first terminal of a sending (or receiving) device can be connected to the center conductor, and a second terminal of the sending (or receiving) device can be connected to the ground shield. If the sending device injects an electrical signal in the center conductor via the first terminal, the electrical signal will propagate along the center conductor causing forward currents in the center conductor, and return currents in the ground shield. The same conditions apply for a two-terminal receiving device."

"In contrast, consider a guided wave communication system such as described in the subject disclosure, which can utilize different embodiments of a transmission medium (including among others a coaxial cable) for transmitting and receiving guided electromagnetic waves without an electrical return path. In one embodiment, for example, the guided wave communication system of the subject disclosure can be configured to induce guided electromagnetic waves that propagate along an outer surface of a coaxial cable. Although the guided electromagnetic waves will cause forward currents on the ground shield, the guided electromagnetic waves do not require return currents to enable the guided electromagnetic waves to propagate along the outer surface of the coaxial cable. The same can be said of other transmission media used by a guided wave communication system for the transmission and reception of guided electromagnetic waves. For example, guided electromagnetic waves induced by the guided wave communication system on an outer surface of a bare wire, or an insulated wire can propagate along the bare wire or the insulated bare wire without an electrical return path."

"Consequently, electrical systems that require two or more conductors for carrying forward and reverse currents on separate conductors to enable the propagation of electrical signals injected by a sending device are distinct from guided wave systems that induce guided electromagnetic waves on an interface of a transmission medium without the need of an electrical return path to enable the propagation of the guided electromagnetic waves along the interface of the transmission medium."

"It is further noted that guided electromagnetic waves as described in the subject disclosure can have an electromagnetic field structure that lies primarily or substantially outside of a transmission medium so as to be bound to or guided by the transmission medium and so as to propagate non-trivial distances on or along an outer surface of the transmission medium. In other embodiments, guided electromagnetic waves can have an electromagnetic field structure that lies primarily or substantially inside a transmission medium so as to be bound to or guided by the transmission medium and so as to propagate non-trivial distances within the transmission medium. In other embodiments, guided electromagnetic waves can have an electromagnetic field structure that lies partially inside and partially outside a transmission medium so as to be bound to or guided by the transmission medium and so as to propagate non-trivial distances along the transmission medium. The desired electronic field structure in an embodiment may vary based upon a variety of factors, including the desired transmission distance, the characteristics of the transmission medium itself, and environmental conditions/characteristics outside of the transmission medium (e.g., presence of rain, fog, atmospheric conditions, etc.)."

"Various embodiments described herein relate to coupling devices, that can be referred to as "waveguide coupling devices", "waveguide couplers" or more simply as "couplers", "coupling devices" or "launchers" for launching and/or extracting guided electromagnetic waves to and from a transmission medium at millimeter-wave frequencies (e.g., 30 to 300 GHz), wherein the wavelength can be small compared to one or more dimensions of the coupling device and/or the transmission medium such as the circumference of a wire or other cross sectional dimension, or lower microwave frequencies such as 300 MHz to 30 GHz. Transmissions can be generated to propagate as waves guided by a coupling device, such as: a strip, arc or other length of dielectric material; a horn, monopole, rod, slot or other antenna; an array of antennas; a magnetic resonant cavity, or other resonant coupler; a coil, a strip line, a waveguide or other coupling device. In operation, the coupling device receives an electromagnetic wave from a transmitter or transmission medium. The electromagnetic field structure of the electromagnetic wave can be carried inside the coupling device, outside the coupling device or some combination thereof. When the coupling device is in close proximity to a transmission medium, at least a portion of an electromagnetic wave couples to or is bound to the transmission medium, and continues to propagate as guided electromagnetic waves. In a reciprocal fashion, a coupling device can extract guided waves from a transmission medium and transfer these electromagnetic waves to a receiver."

"According to an example embodiment, a surface wave is a type of guided wave that is guided by a surface of a transmission medium, such as an exterior or outer surface of the wire, or another surface of the wire that is adjacent to or exposed to another type of medium having different properties (e.g., dielectric properties). Indeed, in an example embodiment, a surface of the wire that guides a surface wave can represent a transitional surface between two different types of media. For example, in the case of a bare or uninsulated wire, the surface of the wire can be the outer or exterior conductive surface of the bare or uninsulated wire that is exposed to air or free space. As another example, in the case of insulated wire, the surface of the wire can be the conductive portion of the wire that meets the insulator portion of the wire, or can otherwise be the insulator surface of the wire that is exposed to air or free space, or can otherwise be any material region between the insulator surface of the wire and the conductive portion of the wire that meets the insulator portion of the wire, depending upon the relative differences in the properties (e.g., dielectric properties) of the insulator, air, and/or the conductor and further dependent on the frequency and propagation mode or modes of the guided wave." (U.S. Pat. No. 9,640,850 col. 4 1. 16—col. 7 1. 16.)

As discussed above with respect to U.S. Pat. No. 9,640,850, a waveguide can be any object including a conductor or an insulator. The desired electromagnetic transmission may be in the form of a surface wave attached to the waveguide object and the signal may be coupled through a drill string component as disclosed herein.

In an embodiment, a system for providing downhole communications in a drilling rig is disclosed. The system includes a plurality of pipes connected end-to-end forming a pipe string. In an exemplary embodiment, each of the plurality of pipes is a drill pipe and the pipe string is a drill string for drilling oil or gas. Each of the plurality of pipes includes an exterior wall, an internal protective coating, and a waveguide. The waveguide for each pipe of the plurality of pipes is coupled to at least one other waveguide for at least one other pipe such that a wave path is formed that extends a length of the plurality of pipes. The system includes a transceiver configured to transmit a communication along the wave path.

In an embodiment, the waveguide is disposed between the exterior wall of a pipe and the internal protective coating of a pipe. The waveguide may include an embedded waveguide secured to either of an interior surface of the exterior wall or a surface of the internal protective coating. Such an embedded waveguide may include a plated conductor such as copper or other suitable material. The waveguide may include surface waves propagated between a dielectric difference between the exterior wall and the internal protective coating of a pipe. In an embodiment, the waveguide is propagated by way of the "Skin Effect" phenomena disclosed herein.

In an embodiment, the system further includes a waveguide coupler configured to carry the communication along the wave path between a first pipe that is attached end-to-end to a second pipe. In such an embodiment, each pipe may include a first waveguide coupler at a first end and a second waveguide coupler at a second end. The two waveguides may be oriented such that each is positioned to carry the communication downhole when the pipes are connected end-to-end in a pipe string. The waveguide couplers are configured to ensure that the communication may be transmitted uninterrupted down the wave path with minimized signal losses at each junction where a first pipe is connected to a second pipe. In an embodiment, the waveguide coupler includes a spring metal sheet configured to conform to an interior cavity of the pipe without fully obstructing a flow of fluid through the pipe. The spring metal sheet may include clamping ears configured to clamp the spring metal sheet to an interior surface of the interior cavity of the pipe to prevent the spring metal sheet from moving or slipping when it encounters vertical or lateral forces. In an embodiment, a conical spring metal sheet is disposed at the ends of each pipe that has a three-dimensional cone shape. A pair of conical spring metal sheets may meet and ensure that the communication may travel downhole between a first pipe and a second pipe with minimal signal loss.

In an embodiment, a method for transmitting a communication downhole in a drilling rig is disclosed. The method includes transmitting a communication from a transceiver. The transceiver is configured to transmit the communication along a wave path extending a length of a plurality of pipes connected end-to-end. Each pipe of the plurality of pipes includes an exterior wall, an internal protective coating, and a waveguide. The waveguide for each pipe of the plurality of pipes is connected to at least one other waveguide for at least one other pipe such that the wave path extends the length of the plurality of pipes.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example" or "an example" means that a particular feature, structure or characteristic described in connection with the embodiment or example is included in at least one embodiment of the present disclosure. Thus, appearances of the phrases "in one embodiment," "in an embodiment," "one example" or "an example" in various places throughout this specification are not necessarily all referring to the same embodiment or example. In addition, it should be appreciated that the figures provided herewith are for explanation purposes to persons ordinarily skilled in the art and that the drawings are not necessarily drawn to scale.

FIG. 1 illustrates an oil rig 100 with a drill string 102 at a depth 104. In an example implementation, the depth 104 may be deep beneath the surface, such as one mile beneath the surface or deeper. A wireless telemetry station 106 on the surface may communicate wirelessly with one or more transceivers on top of the drill string 102. With coaxial transmission lines, a coaxial cable may be mounted to a pipe or other component of the drill string 102.

The drill string 102 on a drilling rig is a column, or string, of a plurality of drill pipes that transmit drilling fluid and torque to the drill bit. The drilling fluid is transmitted by way of a mud pump and torque is transmitted by way of a Kelly drive or top drive. The drill string 102 may refer to the assembled collection of the plurality of drill pipes, drill collars, tools, and the drill bit. The drill string 102 is hollow such that fluid may be pumped downhole through the drill string 102 and circulated back up the annulus (i.e. the void between the drill string and the casing/open hole).

In an embodiment, the drill string 102 is composed a plurality of drill pipes strung together and attached end-to-end. Each of the plurality of drill pipes is hollow. In an embodiment, the drill pipes are thin walled and constructed of steel or other alloy piping that is commonly used in drilling rigs. The drill string 102 is configured to permit drilling fluid to be pumped downhole through a bit and then back up through an annulus. The drill string 102 may come in any suitable size or diameter. The drill string 102 is designed to transfer drilling force through the plurality of individual drill pipes for a combined length that may exceed several miles down into the Earth's crust. The drill string 102 is designed to resist pressure differentials between the interior cavity or each of the drill pipes and the exterior space. Particularly with respect to individual drill pipes that are located deeper in the drill string 102, the drill pipe is designed to suspend the total weight of deeper components. Such drill pipes may be constructed of tempered steel tubs that can be exceptionally costly. Each drill pipe making up the drill string 102 includes a long tubular section with a specified outside diameter. At each end of the drill pipe tubular, there is a larger diameter portion referred to as a tool joint. One end of a drill pipe includes a male pin connection while the other end has a female box connection. The tool joint connections are threaded and allow for the mating of each drill pipe segment to the next segment.

The drill string 102, and/or individual drill pipes making up the drill string 102, may be inspected on site or off location. Ultrasonic testing and modified instruments are utilized at inspection sites to identify detects from metal fatigue and to prevent fracture of the drill string 102 during future wellboring. The drill string 102 includes both the plurality of individual drill pipes and a bottom hole assembly (BHA), which includes a tubular portion closest to the bit. The BHA may be constructed of thicker walled heavy weight drill pipe and drill collars that have a larger outside diameter and provide weight to the drill bit and stiffness to the drilling assembly. Other BHA components may include a mud motor, a measurement while drilling apparatus, one or more stabilizers, and various specialty downhole tools.

Figure 2:
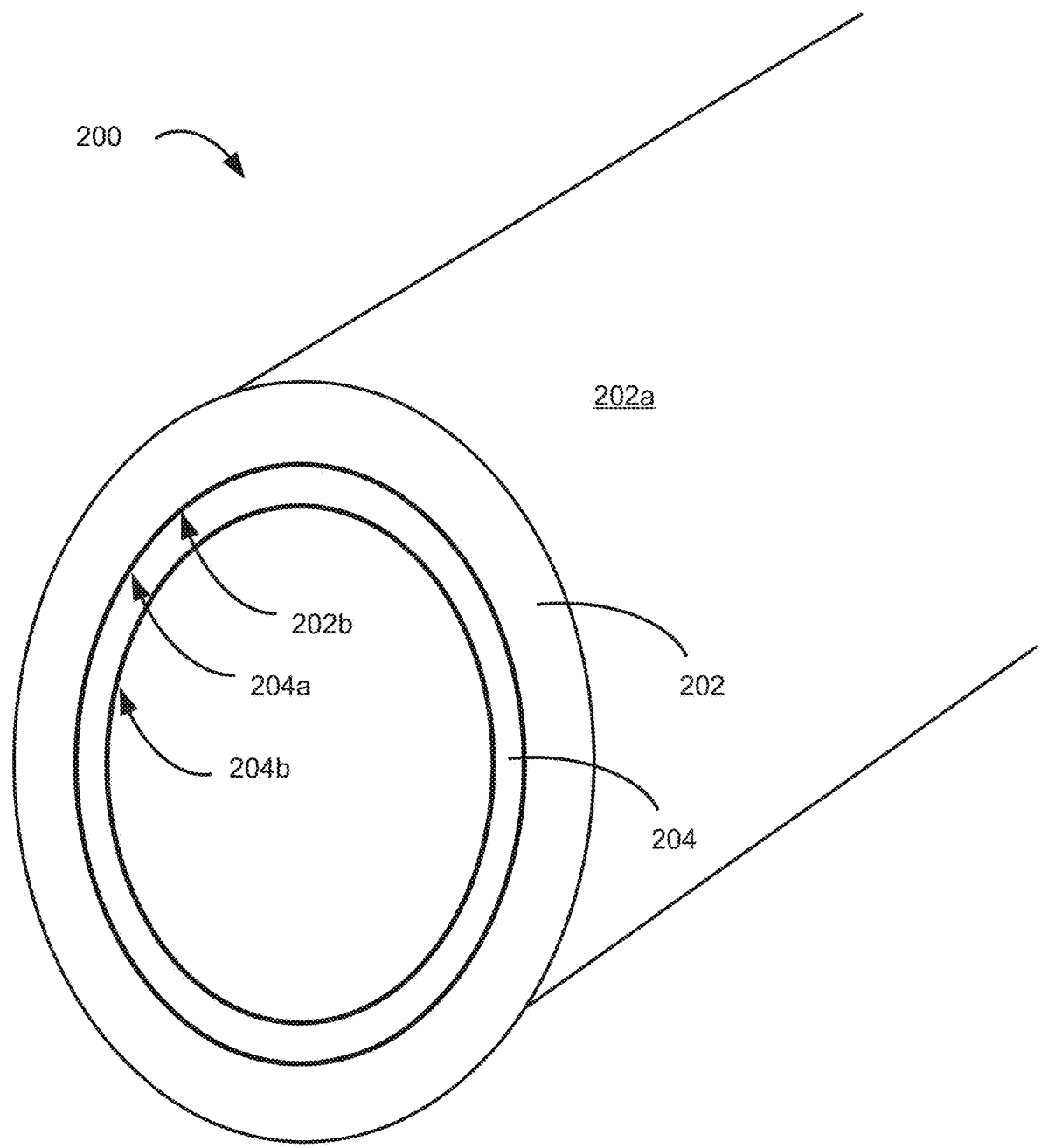
FIG. 2 is a perspective view of a drill pipe illustrating an internal protective coating (IPC), according to one embodiment.

FIG. 2 illustrates a perspective view of a drill pipe 200. The drill pipe includes an exterior wall 202 and an internal protective coating (IPC) 204. The exterior wall 202 has an exterior surface 202a and an interior surface 202b. The internal protective coating 204 has an exterior surface 204a and an interior surface 204b. The interior surface 202b of the external wall 202 and the exterior surface 204a of the internal protective coating 204 may make contact or may form a small gap or cavity. The space between the external wall 202 and the internal protective coating 204 may enable a surface wave to travel the length of the drill pipe 200. The surface wave travels the length of the drill pipe 200 by way of the natural phenomena of "Skin Effect" at high frequencies where the electromagnetic signal travels within the gap of two adjacent bodies (i.e. the external wall 202 and the internal protective coating 204) with different dielectric characteristics without the need of an electrical return path.

Figure 3:
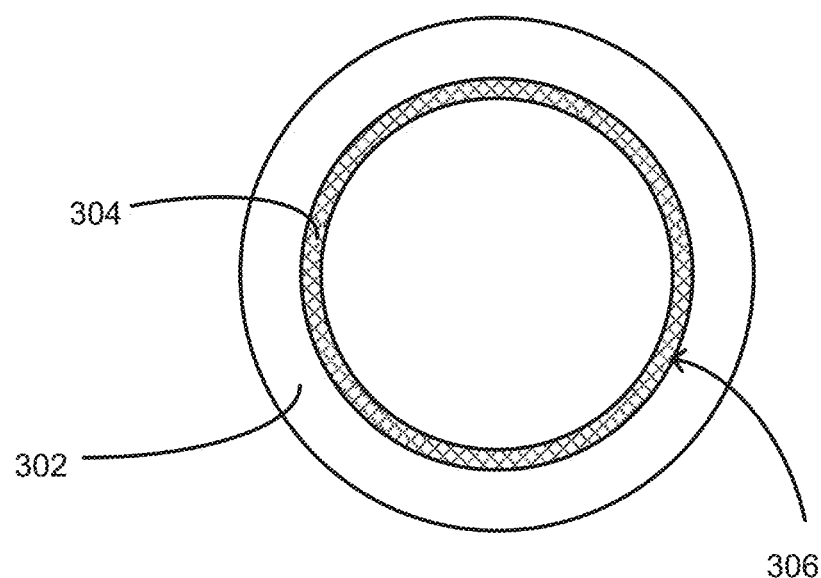
FIG. 3 is an end view of a drill pipe illustrating an internal protective coating (IPC), according to one embodiment.

FIG. 3 illustrates a front cross-section view of a drill pipe illustrating an internal protective coating (IPC) 304 which may be used in tubular components of a drill string 102, such as a drill pipe. The wall 302 of the drill pipe is lined with the IPC 304. The interface 306 between the wall 302 and IPC 304 may be used for transmission of data as discussed above.

Figure 4:
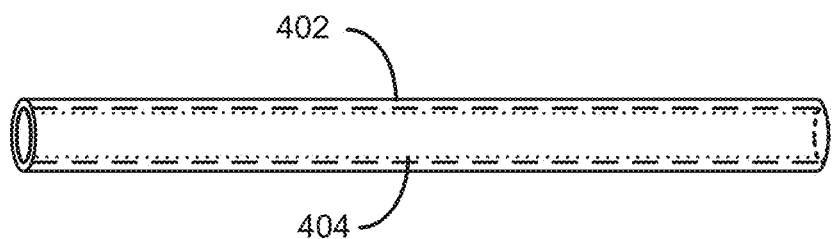
FIG. 4 is a side view of a drill pipe illustrating an internal protective coating (IPC), according to one embodiment.

FIG. 4 illustrates a side view of a drill pipe 402 with an IPC 404 extending along a length of an interior surface of the drill pipe 402. A signal may be propagated through the dielectric gap between the pipe wall and the IPC 404. In one embodiment, a thin conductor may be embedded between the pipe wall and the IPC 404.

FIG. 5 illustrates a system 500 for drill string communication, according to one embodiment. As referred to herein, a drill string may include a plurality of drill pipes or tubulars strung together. The plurality of drill pipes or tubulars in the drill string may be connected electrically in series or may have electrical connections in parallel. The system 500 includes a controller 502, a top transceiver 504, one or more tubulars 506, and a drill string end 508 (such as a drilling bit).

The controller 502 may manage operation of a drill string or manage communication by the top transceiver between downhole transceivers. The controller 502 may include a processor, memory, input devices, and/or a display for allowing for human operation or monitoring of the drill string. The top transceiver 504 may include a transceiver at or near a top of the exit location of a drill string. The one or more tubulars 506 may include pipe or other accessories within the drill string. Each of the one or more tubulars 506 may be coupled to each other for flow of mud. Additionally, each of the one or more tubulars 506 may act as a waveguide for communication of data between the top transceiver 504 and/or one or more downhole transceivers. Some of the tubulars 506 may further include a downhole transceiver. For example, transceivers may only be needed every 100, 200, 300 or other number of pipes or joints. For example, a transceiver may not be needed at each pipe because the signal loss across the joints may be low enough that signals may be propagated and received across multiple pipe lengths and/or joints. The drill string end 508 may include a bit or other tip for drilling. The drill string end 508 may include a transceiver for receiving information from and/or transmitting information to the top transceiver 504.

FIG. 6 illustrates example drill string components (e.g., tubulars or drill string ends) that may be used. For example, the tubulars 506 of FIG. 5 may include any of a drill pipe 614, heavy weight drill pipe 612, drill collar 610, crossover 602, stabilizer 604, bit sub 606, or bit 608. The drill string end 508 of FIG. 5 may include a bit 608 or another drill string end. Many, if not most, of the string components (i.e., tubulars) have an IPC to protect the internal wall from corrosion and abrasion during drilling operations. That IPC is typically made of a dielectric material such as a hard polymer, ceramic, or an epoxy.

Figure 7:
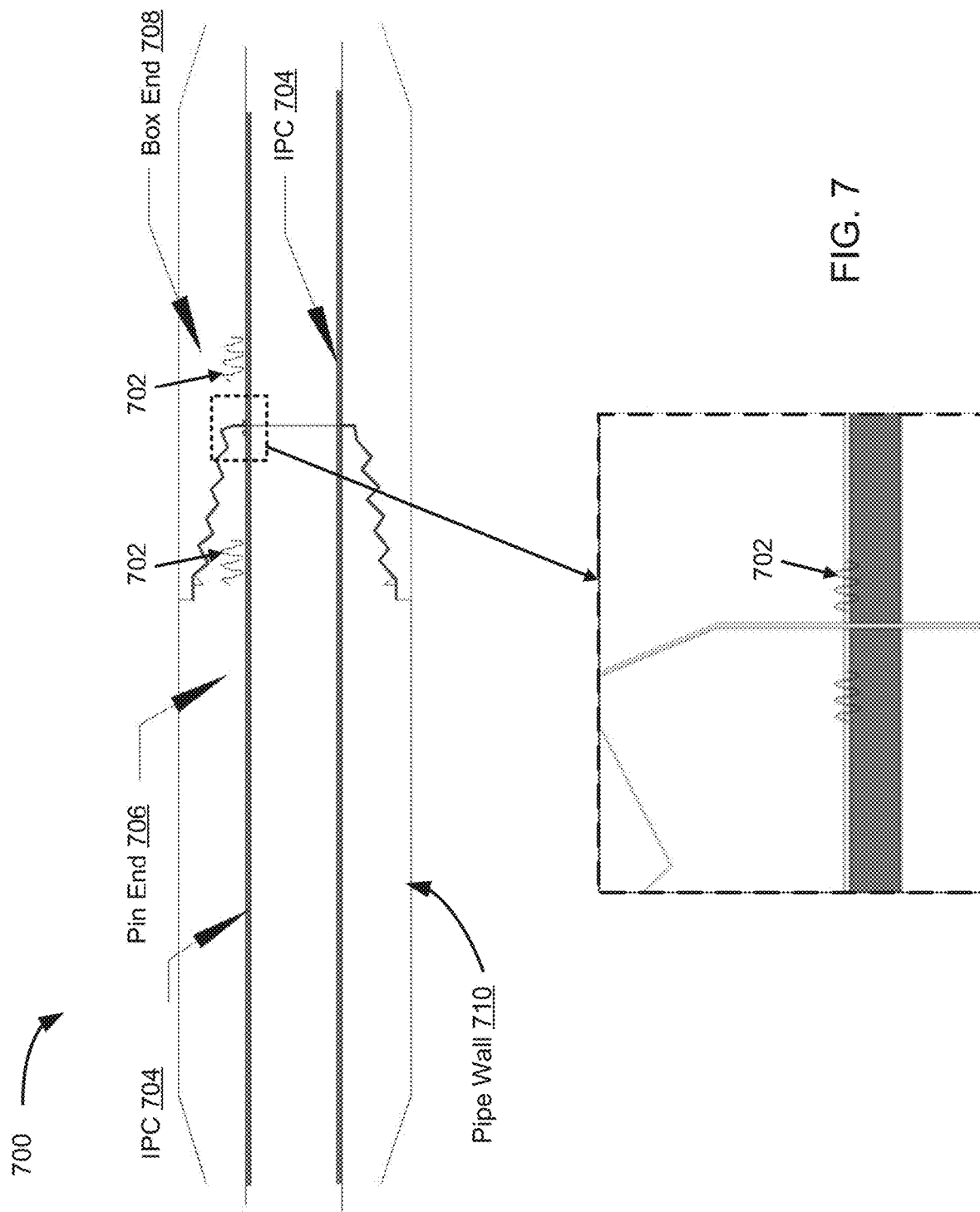
FIG. 7 illustrates an interface between a pin end of first pipe and a box end of second pipe with signals traveling between a pipe wall and IPC, according to one embodiment.

FIG. 7 illustrates an interface 700 between a pin end 706 of first pipe and a box end 708 of second pipe with signals traveling between a pipe wall 710 and IPC 704. For example, the signals may be within surface waves 702 that propagate between the dielectric difference between the pipe wall 710 and the IPC 704 itself. In this case, the IPC 704 serves as the waveguide and when pipes are coupled to each other by screwing them together, the wave guides align and extend to the next section, as illustrated. This illustrates one embodiment where signals and waves are transmitted in the pipe IPC interface 700. In some embodiments, this may allow for the use of many existing drill pipes in an unmodified state for acting as a waveguide for signals.

In an embodiment, an insulated conductor is embedded within the inside wall of a drill pipe or tubular. The insulated conductor may be embedded within a new or used drill pipe or tubular. This implementation may be particularly beneficial in applications where the drill pipe or tubular does not have adequate insulating coating.

Figure 8A:
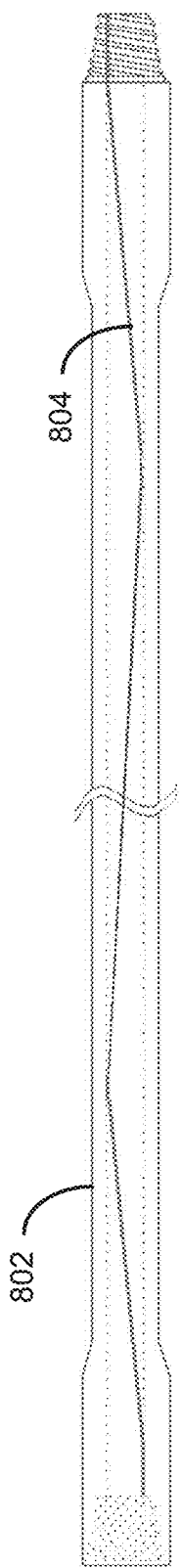
FIG. 8A is a schematic side view of a drill pipe with an embedded waveguide, according to one embodiment.

FIG. 8A illustrates a drill pipe 802 with an embedded waveguide 804 (may alternatively be referred to as a conductor). The waveguide 804 (either insulated or not) may be placed on or within the IPC during the manufacturing or refurbishing process. This waveguide 804 can be a cable or a plated copper strip on the inside wall of the pipe and/or an outside wall of the IPC. The physical path of the waveguide 804 can be a spiral, or a series of spirals, or other desired mechanical designs to provide needed electrical and communications characteristics and to allow for mechanical strain relief during bending or stretching of the pipe. Because the waveguide 804 is within the pipe but not within the IPC, reduced risk of damage to the conductor or interference with mud flow is achieved over embodiments where cables are internal to the pipe.

Figure 8B:
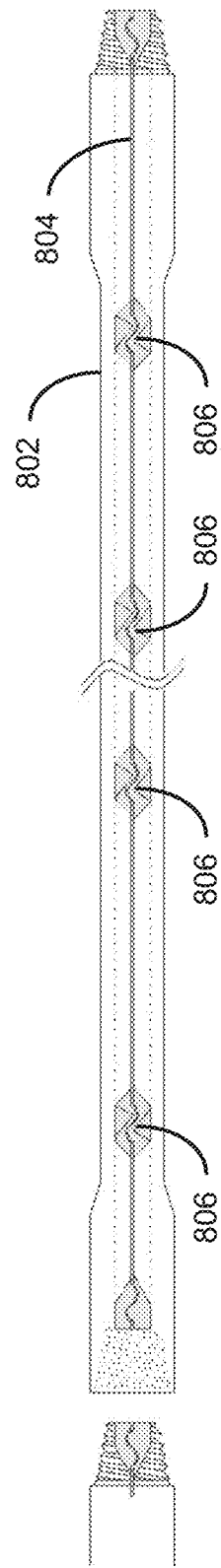
FIG. 8B is a schematic side cross-sectional view of a drill pipe with an embedded waveguide and a plurality of spring metal sheets, according to one embodiment.

FIG. 8B illustrates a side cross-sectional view of a drill pipe 802 with an embedded waveguide 804. As illustrated in FIG. 8B, the waveguide 804 may be secured in place by attaching the waveguide 804 to a spring metal sheet 806 as illustrated in FIG. 8B. The spring metal sheet 806 may include characteristics as tempered blue spring steel or similar metal spring characteristics. The spring metal sheet 806 may be folded such that it may be slid into the drill pipe 802 cavity. Once the spring metal sheet 806 is located within the cavity of the drill pipe 802, the spring metal sheet 806 may naturally conform to the shape of the inside wall of the drill pipe 802 and provide anchoring to the waveguide 804 within minimal obstruction of flow. Clamping ears on the spring metal sheet 806 may provide strain relief against vertical and lateral forces. Further, the spring metal sheet 806 may act as a signal "launcher" as needed.

Figure 8C:
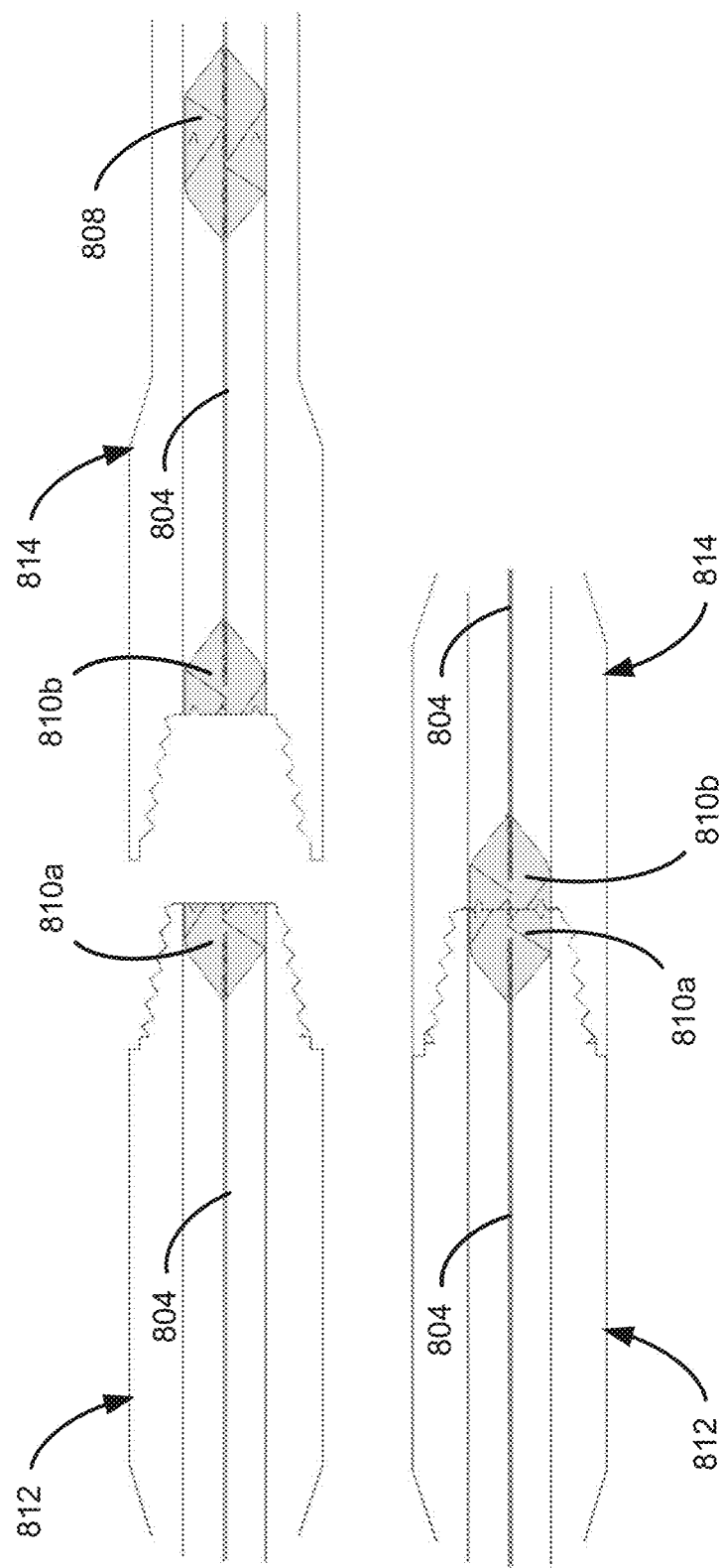
FIG. 8C is a schematic side cross-sectional view of a first pipe and a second pipe having conical spring metal sheet, according to one embodiment.

FIG. 8C illustrates side cross-sectional views of a first drill pipe 812 and a second drill pipe 814. The first drill pipe 812 includes a first spring metal sheet ending 810a (may alternatively be referred to as a first waveguide coupler). The second drill pipe 814 includes a second spring metal sheet ending 810b (may alternatively be referred to as a second waveguide coupler). The spring metal sheet endings 810a, 810b may be cut in the shape of a three-dimensional cone to act as a waveguide or conductor when coupled together. The path of the waveguide 804 may be physically interrupted in every connection, but because of the waveguides 804 of the first drill pipe 812 and the second drill pipe 814 being aligned, this interruption represents a small loss to the system. The low loss is due to the nature of electromagnetic waves tending to travel in a straight direction when a waveguide 804 is interrupted. The spring metal sheets (also referred to as the waveguide couplers) are configured to couple or align the surface wave travelling down a drill string. In an embodiment, the surface wave travels within a gap between the internal protective coating an interior side of the exterior wall of a drill pipe.

Figure 9:
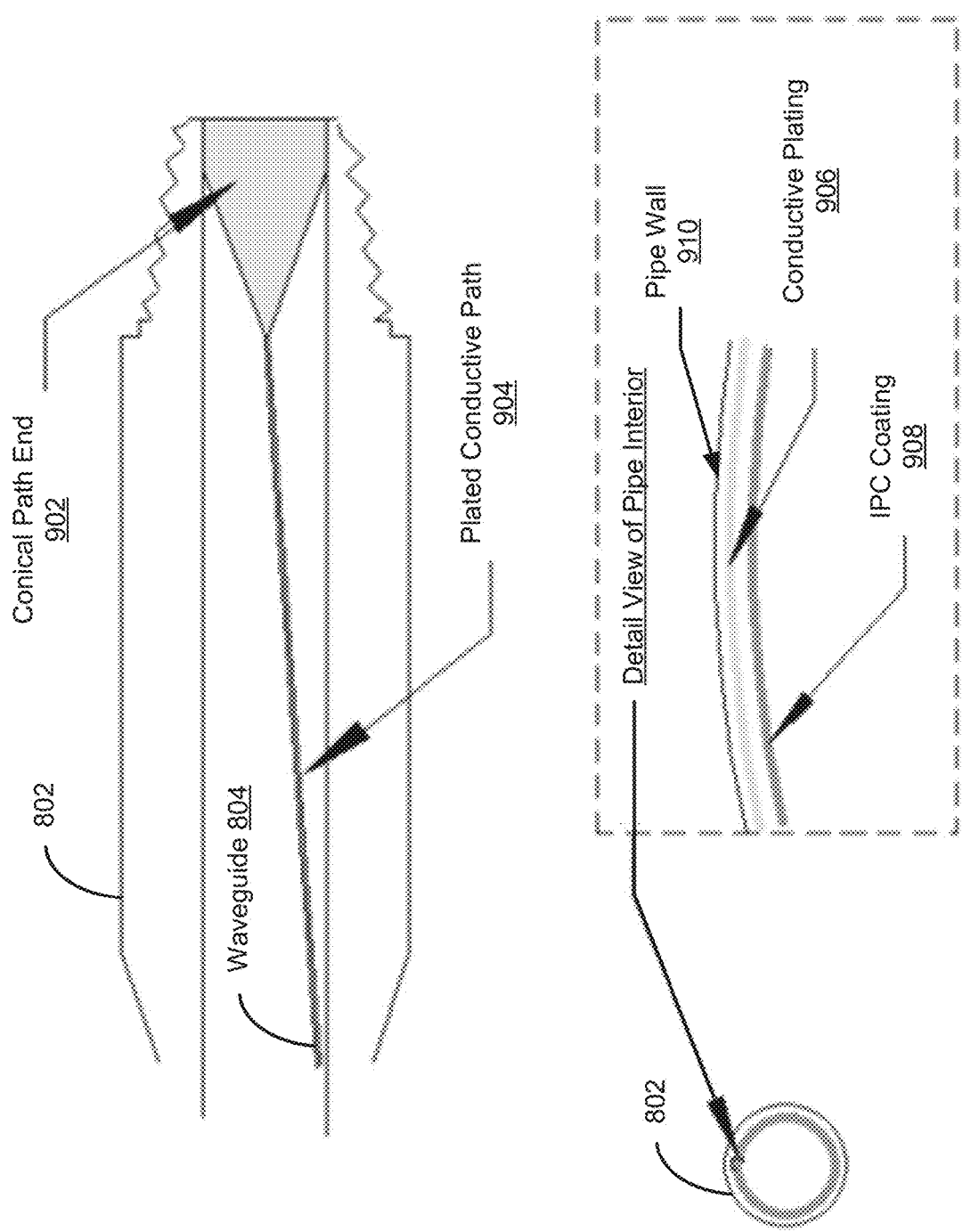
FIG. 9 is a schematic side view of an end of a drill pipe illustrating a three-dimensional cone shape of a conductor, according to one embodiment.

FIG. 9 illustrates an end of the drill pipe 802 of FIG. 8 to illustrate how the waveguide 804 can communicate a signal to a subsequent pipe. FIG. 9 illustrates a conical path end 902 (may alternatively be referred to as a waveguide coupler coupler) of a drill pipe 802 that enables the drill pipe 802 to be matched with a different pipe such that it will maintain an electrical or conductive connection with the waveguide 804. As illustrated, the waveguide 804 takes a plated conductive path 904 and ends with a conical path end 902. The detail view of the pipe interior illustrates the conductive plating 906 of the wave guide 804 and the IPC coating 908 that coats the waveguide 804. The conductive plating 906 may run adjacent to the pipe wall 910 as illustrated in the detail view of the pipe interior.

Specifically, as illustrated in FIG. 9, the ending (i.e. at the end of the drill pipe 802 where the drill pipe 802 might match with a different pipe) of the waveguide 804 has a conical path end 902. The conical path end 902 is the shape of a three-dimensional cone such that the full outside circumference of the IPC coating 908 matches with the waveguide 804 of a subsequent pipe when they are coupled together. In one embodiment, if the waveguide 804 at the end covers more than about ½ of the circumference, electrical or electromagnetic communication with the next pipe may be established. For example, the full circumference of the gap at the end of the drill pipe may be conductive plating such that the waveguide 804 of different pipes meet regardless of the respective rotation of the pipes. In one embodiment, the cone may be an insert or a plated surface between the IPC and the wall of a drill pipe. The wave path may be physically interrupted resulting in a loss at every connection, but because of the waveguide 804 being aligned, this interruption represents a small loss to the whole system.

FIG. 10A depicts a side cross-sectional view of a drill pipe 1002 with a built-in transceiver 1004 and FIG. 10B depicts an aerial cross-sectional view of the drill pipe 1002 with the built-in transceiver 1004. The drill pipe 1002 includes spring metal sheets 1008 configured for anchoring the waveguide within the interior of the drill pipe 1002 (see 808 in FIG. 8C). The drill pipe 1002 further includes a first spring metal sheet ending 1010a at a first end of the drill pipe 1002 and a second spring metal sheet ending 1010b at a second end of the drill pipe 1002 (see 810a and 810b).

In one embodiment, drill string components that include transceivers may be used every N components. For example, N may be the number of joints, pipes or accessories that still results in an acceptable signal loss for transmitted signals. Thus, not every drill pipe or drill string component is necessarily required to include a transceiver. In one embodiment, the transceiver 1004 is mounted inside a housing that provides the same inside diameter and outside diameter as that of the tool connections of the pipe, as much as possible. The housing contains the electronic circuits required for receiving and transmitting signals, any other digital or analog interfacing circuity such as tuners, amplifiers, modulators, demodulators, digital processing, sensor devices, space and coupling connections for other third-party devices, etc. as well as any batteries that provide power to the components. The length of the transceiver housing can be as short as permitted by the make-up equipment at the rig (e.g., typically 6 feet in some embodiments).

In one embodiment, the transceiver housing uses the same method as other pipes in the drill string (e.g., the IPC pipe interface 704 of FIG. 7 or the waveguide 804 of FIGS. 8 and 9). In one embodiment, the pipe 1002 may use an embedded wire for receiving/collecting a signal from a neighboring pipe or tubular member. The wire can be routed from the internal wall (e.g., between the IPC 908 and pipe wall 910) to the electronics of the transceiver 1004 in the housing through one or more small boreholes 1006, where the appropriate circuitry would process the signal.

Figure 11A:
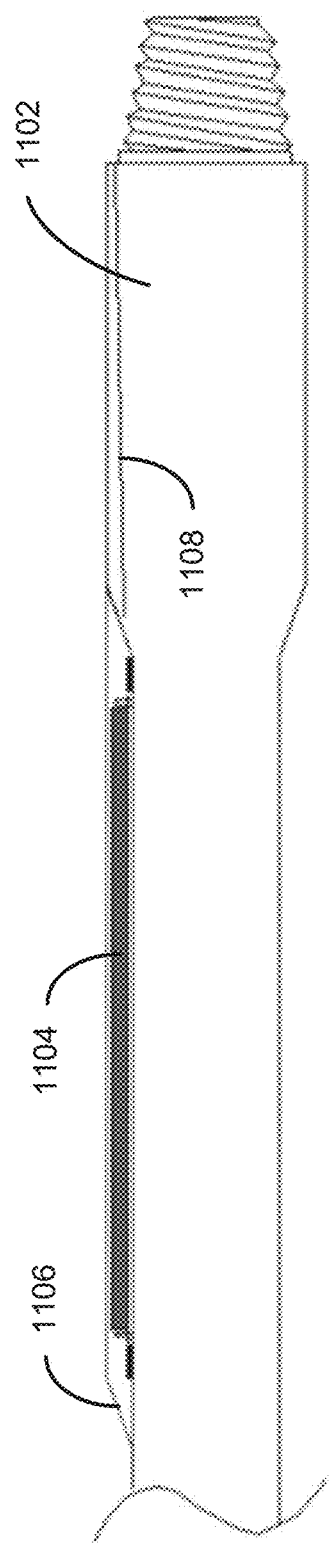
FIG. 11A is a schematic side view of a drill pipe with a transceiver and housing that can be clamped to an outside of the pipe, according to one embodiment.
Figure 11B:
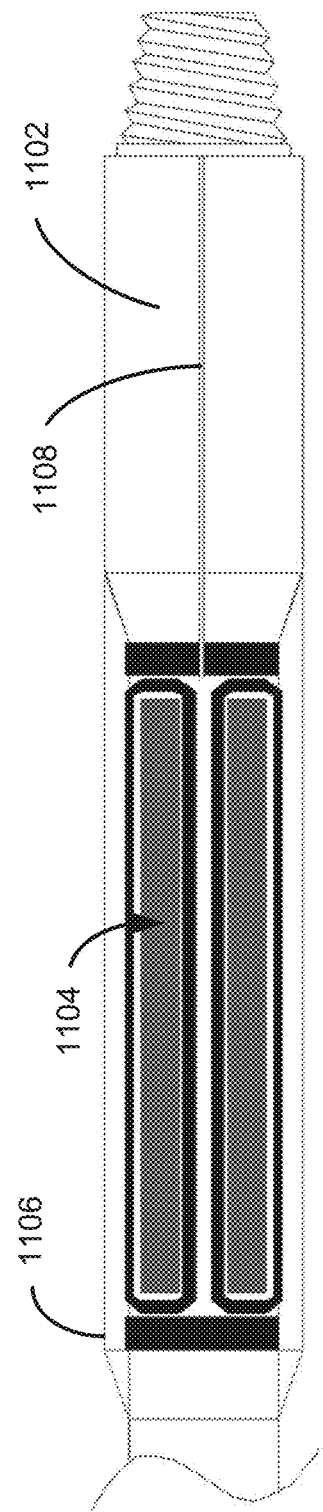
FIG. 11B is an aerial view of a drill pipe with a transceiver and housing that can be clamped to an outside of the pipe, according to one embodiment.

FIG. 11A illustrates a side view of a drill pipe 1102 and FIG. 11B illustrates an aerial cross-sectional view of the drill pipe 1102. The drill pipe 1102 includes a transceiver 1104 and a transceiver housing 1106 that can be clamped to the outside of the drill pipe 1102, resulting in an increased diameter of at least a portion of the drill pipe 1102. In one embodiment, the increased outside diameter is still substantially the same or less than the largest outside diameter of the pipe (e.g., the diameter near the ends). For example, where size permits, the transceiver housing 1106 can be in the form of a clamp that can be mounted and wrapped around the pipe pin end itself, and secured with suitable fasteners and sealing methods. Once again, a small borehole 1108 may provide electrical or electromagnetic communication between an interior wall of the pipe and the transceiver 1104.

Figure 12:
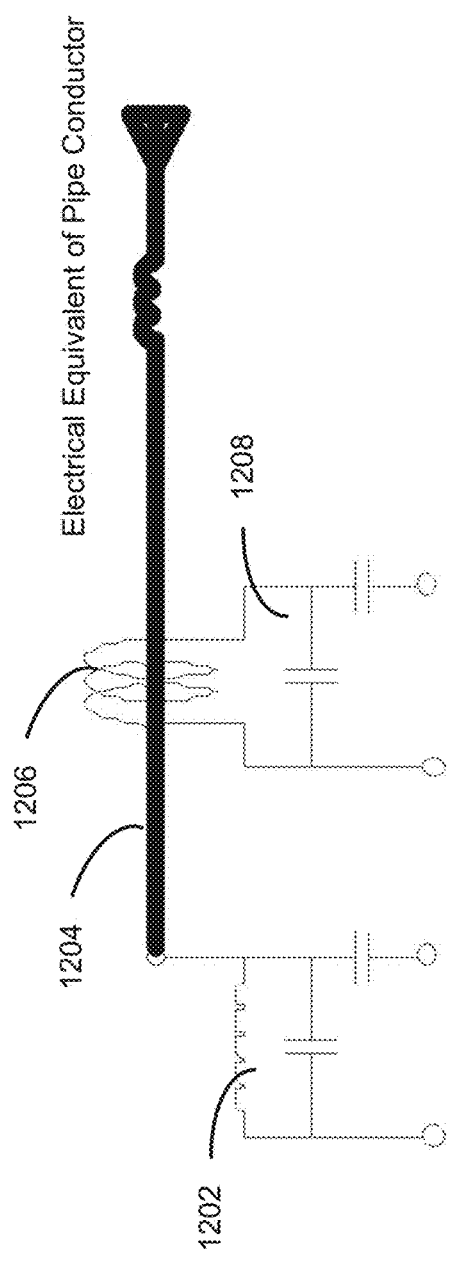
FIG. 12 is a schematic diagram illustrating a simplified equivalent tuned circuit for transmitting information using the pipe or conductor as a signal medium or waveguide, according to one embodiment.

FIG. 12 illustrates a simplified equivalent tuned circuit for transmitting information using the pipe or conductor as a signal medium or waveguide. The transceiver's receiving and transmitting tank circuits 1202, 1208 can be coupled to the conductor 1204 by wave launchers. A simplified example of possible signal injection 1206 and pick is illustrated in FIG. 12, but other methods such as surface wave launchers, impedance matching, phase difference between the wire and the surrounding pipe, near field effect detection, etc. may be used.

Figure 13:
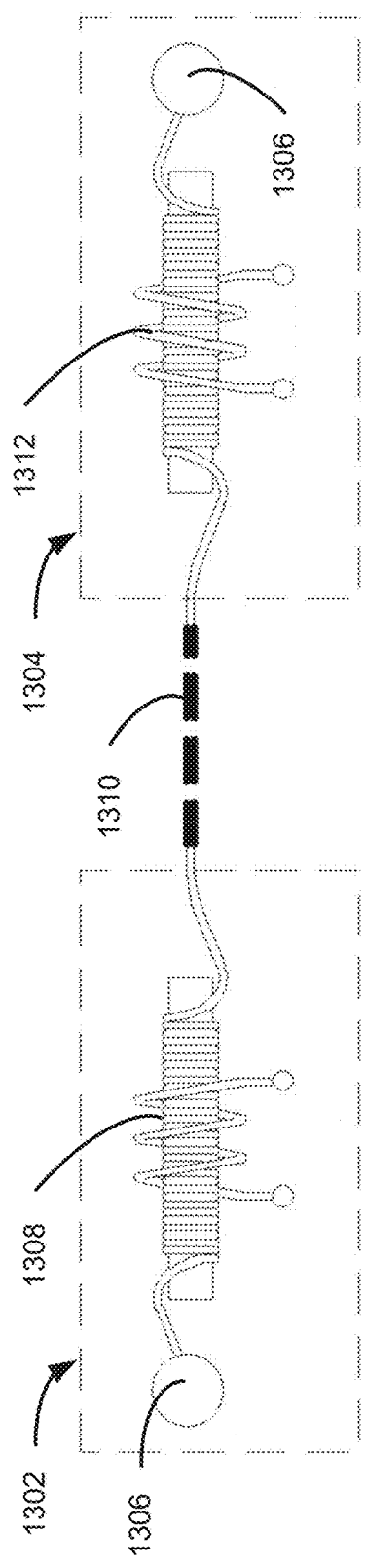
FIG. 13 is a diagram illustrating how information or power may be transmitted between transmitters located on different pipes and/or with multiple intervening pipes, according to one embodiment.

FIG. 13 illustrates how information or power may be transmitted between transmitters located on different pipes and/or with multiple intervening pipes. Specifically, a transmitting section 1302 of the transceiver of a first pipe outputs its signal to the wire by wave launchers to a receiving section 1304 of a second pipe. The transmitting section 1302 of the first pipe includes a dummy load 1306 and a transmitter coil 1308. A waveguide 1310 throughout the string connects pipe to pipe. The receiver section 1304 of the second pipe includes a receiver coil 1312 and dummy load 1306.

Because pipes are connected in series to each other, the conductive path of interest is extended by the length of each additional pipe throughout the length of the conductive path 1310 of the string. The transmission of signal is achieved by capturing the surface waves on the conductive path 1310 that acts in effect as a wave guide. When transmitting power, Suitable termination would be applied at the ends of the conductive path 1310 (see 1308 and 1312) to prevent radiation and reflection of the radio frequency signal. The use of multiple tuned circuits enables the possibility to transmit multiple bands or to separate the transmission direction from up or down the conductive path 1310 of the string. One of the possibilities is to use one or many special tuned circuits to provide a charging potential to the batteries in the transceiver housing or power to motors downhole. Thus, a first set of tuned circuits may be used for communication into the hole, a second set of tuned circuits may be used for communication out of the hole, and a third set of tuned circuits may be used for transmitting power to electrical loads or components (e.g., batteries or motors). Additional or fewer sets of tuned circuits may be used for any other purposes. In one embodiment, these tuned circuits may use the same waveguide or conductor for these multiple communication/powering purposes each independent of each other.

Figure 14:
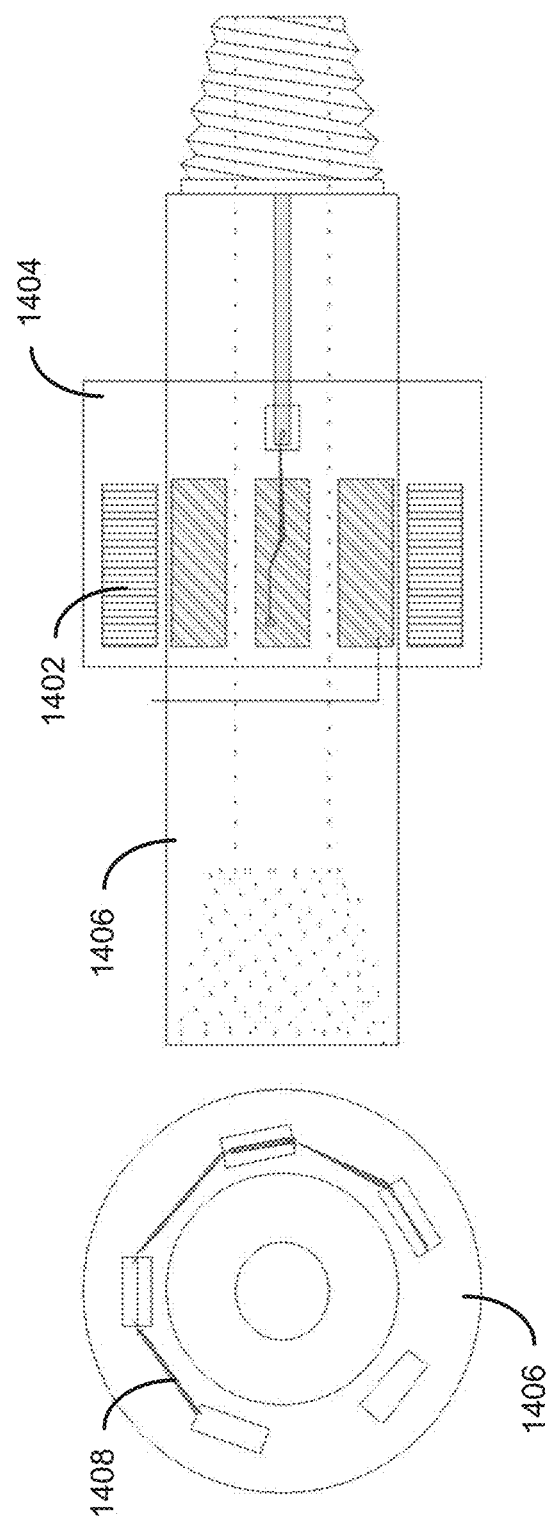
FIG. 14 is a side view of a pipe with transceiver to be used at the top of a drill string, according to one embodiment.

FIG. 14 illustrates a transceiver 1402 to be used at the top of a drill string (i.e., top transceiver 504). The transceiver 1402 at the top of the string can be mechanically connected to the top-drive of the string. It may have a different layout of its components and they would be inside an enclosure 1404 attached to the outside perimeter of a short pipe 1406. It will serve as a downhole network entry point controller. It can also contain a wireless transmitter to communicate to a remote panel (e.g., controller 502) where the network signals can be processed and interpreted as desired by a master network controller and its appropriate controlling software to provide a suitable interface and command console. The command console may be provided to third parties and may be configured for monitoring network performance including data consumption information.

The power to this top transceiver can be provided by re-chargeable batteries, directly, or by inductive field. In an embodiment, the top transceiver (or any other transceivers) are powered by a hard-wired connection that provides charging energy to transceivers downhole or to other devices that may require recharging while downhole, including motors. The antenna 1408 to communicate to remote external devices (e.g., controller 502) can be a half loop that arcs around the enclosure 1404 to provide a constant signal during rotation of the string.

According to one embodiment, from the signal perspective, the insertion loss in every joint connection can be less than 0.2 db. With a transceiver that can process a −60-db. signal, a transceiver would be placed at a count of about every 300 joints. Using Range-2 pipe with a nominal length of 31.5 feet, the distance between transceivers would be 9450 feet—compared to the typical spacing of about 1500 feet for wired pipe using a coax cable and inductive couplers.

As discussed previously, the transceivers may use different wireless bands for different purposes. The following are example wireless spectrum bands, some of which may be used for downhole communication: the very low frequency (VLF) band from 3 kHz to 20 kHz (wavelength of 100 km to 10 km) which is sometimes used for maritime radio and navigation; the low frequency (LF) band from 30 kHz to 300 kHz (wavelength of 10 km to 1 km)which is sometimes used for maritime radio and navigation; the medium frequency (MF) band from 300 kHz to 3 MHz (wavelength of 1 km to 100 m) which is sometimes used for AM radio, aviation radio, and navigation; the high frequency (HF) band from 3 MHz to 30 MHz (wavelength of 100 meters (m) to 10 m) which is sometimes used for shortwave radio; the very high frequency (VHF) band from 30 MHz to 300 MHz (wavelength of 10 m to 1 m) which is sometimes used for VHF television and FM radio; the ultra-high frequency (UHF) band from 300 MHz to 3 GHz (wavelength from 1 m to 10 cm) which is sometimes used for UHF television, mobile phones, GPS, Wi-Fi, and 4G communication; the super high frequency (SHF) band from 3 GHz to 30 GHz (wavelength from 10 cm to 1 cm) which is sometimes used for satellite communications and Wi-Fi; and the extremely high frequency (EHF) band from 30 GHz to 300 GHz (wavelength from 1 cm to 1 mm) which is sometimes used for radio astronomy and satellite communications.

Figure 15:
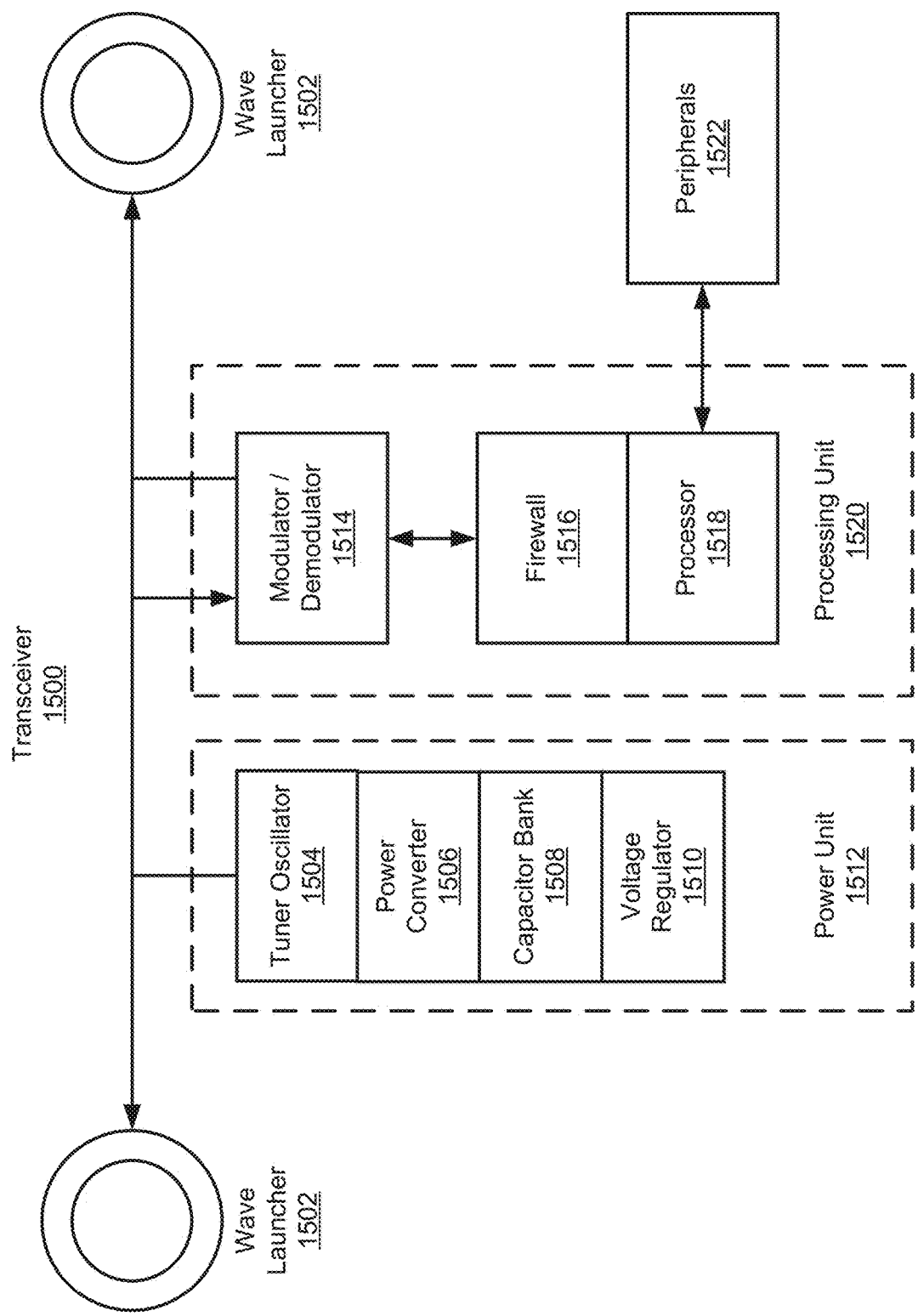
FIG. 15 is a schematic block diagram of a transceiver, according to one embodiment.

FIG. 15 illustrates a block diagram of a transceiver 1500. The transceiver includes a wave launcher 1502 which may alternatively be referred to as a detector. The wave launchers couple or decouple the signals from the waveguide. The transceiver includes a power unit 1512 and the power unit includes a tuner oscillator 1504, a power converter 1506, a capacitor bank 1508, and a voltage regulator 1510. The tuner oscillator 1504 gets excited and becomes resonant at specific frequencies providing resonant energy to the power converter 1506. The power converter regulates that energy to provide charging current to the capacitor bank 1508. The capacitor bank stores the energy and provides it as needed to the voltage regulator 1510 which provides power to the processing unit 1502. The transceiver 1500 includes a processing unit 1520. The processing unit 1520 includes a modulator/demodulator 1514 which, via the launchers 1502, extracts or embeds the information into a carrier signal suitable for waveguide transmission, a firewall 1516 (may alternatively be referred to as a network hub) which provides secure bidirectional network communication, and a processor 1518 which interprets the communication data, acts or responds with information about the processing unit itself or with information from interfacing with peripherals 1522 such as third-party instrumentation.

The transceiver 1500 may utilize high encryption protocols to provide network access and security. Each transceiver 1500 may have its own pressure, temperature, and azimuth sensors but may further offer an interface to other instrumentation components desired by other third parties.

The communication may be classified as 3G or 4G. In one embodiment, transceivers or processors for transmitting or processing signals may include off-the-shelf 3G, 4G, 5G, Wi-Fi, or any other wireless communication standard. The 3G wireless communication standard may have a frequency band of 1.8 to 2.5 GHz and a bandwidth of 5-20 MHz. The data rate for 3G communications may be up to 2 Mbps and access may be achieved by way of wideband CDMA (Code Division Multiple Access). The 4G wireless communication standard may have a frequency band of 2 to 8 GHz and a bandwidth of 5-20 MHz. The data rate may be up to 20 Mbps or more and access may be achieved by way of CDMA or OFDM (Orthogonal Frequency-Division Multiplexing).

The systems and embodiments disclosed herein may be used in any of the following ways (one or more of which at the same time): within a "single-conductor" communication system which represents a disruptive introduction of technology to the field of downhole telemetry; within an electromagnetic surface waveguide system, not a transmission line system; a system with no electrical couples or electrical contacts; in a system that uses existing geometrical requirements of concentricity and IPC for pipe in order to couple a signal from pipe to pipe; a system in a system where electromagnetic wave travels in the dielectric medium (e.g., between an IPC and metallic pipe wall; within the 100 MHz to 100 GHz (VHF to SHF) bands and/or higher for extremely fast communication and data throughput; in a system that works far beyond the current fastest telemetry system (hundreds of times) that is limited to a 5 Mhz carrier frequency using a coax cable and inductive couplers; within a system using bidirectional communications; within a system having the ability to carry multiple bands for multiple purposes and/or which can easily accommodate multiple equivalent Wi-Fi or 4G bands; as part of a system to transmit power to loads located at a distance from a power source (e.g., transmit along a single waveguide to a load); a system that does not require an electrical return path; in a system that does not interfere with mud flow in the pipes; and/or a system that will need less repeaters than existing systems, such as two or three instead of 20 for a four-mile well bore.

The systems and embodiments may be easily manufactured due to one or more of the following in some embodiments: easy conversion of pipe components and may use existing pipe manufacturing processes and requirements; no twisted [air, parallel line or coaxial cables inserted in the pipe (or on the outside of the pipe); dramatically lower conversion costs as compared to that of current wired pipe; systems may not require long lead times or special and expensive pipe modifications such as gun-drilling or boring or machining; systems may not use expensive inductive couplers; systems may not require a tensioned cable; systems may not require armored cables; systems may not require electrical conductors in some embodiments.

Embodiments may also provide one or more of the following advantages during usage in the field: may not require especial handling of the pipe in the rig, because it can be treated as conventional pipe and there are no inductive coils to damage; embodiments may not change the recommended make-up torque (RMUT) of string components (torque specs); and/or existing pipe inventory can be easily converted.

EXAMPLES

The following examples pertain to further embodiments.

Example 1 is a system for a single-line transmission along a plurality of pipes. The system includes a plurality of pipes connected end-to-end forming a pipe string. Each pipe of the plurality of pipes comprises an exterior wall, an internal protective coating, and a waveguide. The waveguide for each pipe of the plurality of pipes is connected to at least one other waveguide for at least one other pipe such that a wave path is formed that extends a length of the plurality of pipes. The system includes a transceiver configured to transmit a communication along the wave path.

Example 2 is a system as in Example 1, wherein the waveguide comprises an embedded waveguide attached to one or more of: an interior surface of the exterior wall of each of the plurality of pipes; or a surface of the internal protective coating of each of the plurality of pipes; wherein the embedded waveguide comprises a plated conductor.

Example 3 is a system as in any of Examples 1-2, wherein the waveguide comprises a spiral path such that mechanical relief is provided to the waveguide during bending or stretching of any of the plurality of pipes.

Example 4 is a system as in any of Examples 1-3, wherein the waveguide comprises surface waves propagating between a dielectric difference between the exterior wall and the internal protective coating of each of the plurality of pipes.

Example 5 is a system as in any of Examples 1-4, wherein each pipe of the plurality of pipes further comprises a waveguide coupler configured to carry the communication along the wave path between a first pipe secured to a second pipe.

Example 6 is a system as in any of Examples 1-5, wherein the waveguide coupler comprises a first waveguide coupler secured to a first end of a pipe and a second waveguide coupler secured to a second end of the pipe.

Example 7 is a system as in any of Examples 1-6, wherein the first waveguide coupler of a first pipe makes contact with the second waveguide coupler of a second pipe such that the wave path is not interrupted between the first pipe and the second pipe.

Example 8 is a system as in any of Examples 1-7, wherein the waveguide coupler comprises a spring metal sheet configured to conform to an interior cavity of the pipe without fully obstructing a flow of fluid through the pipe.

Example 9 is a system as in any of Examples 1-8, wherein the spring metal sheet further comprises one or more clamping ears configured to clamp the spring metal sheet to a surface of the interior cavity of the pipe and provide strain relief to the spring metal sheet against vertical and lateral forces.

Example 10 is a system as in any of Examples 1-9, wherein the spring metal sheet comprises a three-dimensional conical shape and is constructed of a flexible conductive material.

Example 11 is a system as in any of Examples 1-10, further comprising a transceiver housing configured to secure the transceiver to a pipe of the plurality of pipes.

Example 12 is a system as in any of Examples 1-11, further comprising a plurality of transceivers each configured to transmit and receive the communication along the wave path, wherein the plurality of transceivers are located intermittently along the plurality of pipes such that not every pipe of the plurality of pipes comprises a transceiver.

Example 13 is a method for transmitting a communication along a plurality of pipes. The method includes transmitting a communication from a transceiver. The transceiver is configured to transmit the communication along a wave path extending a length of a plurality of pipes connected end-to-end. Each pipe of the plurality of pipes comprises an exterior wall, an internal protective coating, and a waveguide. The waveguide for each pipe of the plurality of pipes is connected to at least one other waveguide for at least one other pipe such that the wave path extends the length of the plurality of pipes.

Example 14 is a method as in Example 13, wherein the waveguide comprises an embedded waveguide attached to one or more of: an interior surface of the exterior wall of each of the plurality of pipes; or a surface of the internal protective coating of each of the plurality of pipes; wherein the embedded waveguide comprises a plated conductor.

Example 15 is a method as in any of Examples 13-14, wherein the waveguide comprises a spiral path such that mechanical relief is provided to the waveguide during bending or stretching of any of the plurality of pipes.

Example 16 is a method as in any of Examples 13-15, wherein the waveguide comprises surface waves propagating between a dielectric difference between the exterior wall and the internal protective coating of each of the plurality of pipes.

Example 17 is a method as in any of Examples 13-16, wherein each pipe of the plurality of pipes further comprises a waveguide coupler configured to carry the communication along the wave path between a first pipe secured to a second pipe.

Example 18 is a method as in any of Examples 13-17, wherein the waveguide coupler comprises a first waveguide coupler secured to a first end of a pipe and a second waveguide coupler secured to a second end of the pipe.

Example 19 is a method as in any of Examples 13-18, wherein the first waveguide coupler of a first pipe makes contact with the second waveguide coupler of a second pipe such that the wave path is not interrupted between the first pipe and the second pipe.

Example 20 is a method as in any of Examples 13-19, wherein the waveguide coupler comprises a spring metal sheet configured to conform to an interior cavity of the pipe without fully obstructing a flow of fluid through the pipe.

Example 21 is a method as in any of Examples 13-20, wherein the spring metal sheet further comprises one or more clamping ears configured to clamp the spring metal sheet to a surface of the interior cavity of the pipe to provide strain relief to the spring metal sheet against vertical and lateral forces.

Example 22 is a method as in any of Examples 13-21, wherein the spring metal sheet comprises a three-dimensional conical shape and is constructed of a flexible conductive material.

Example 23 is a method as in any of Examples 13-22, wherein transmitting the communication from the transceiver comprises transmitting the communication through a plurality of transceivers each configured to transmit and receive the communication along the wave path, wherein the plurality of transceivers are located intermittently along the plurality of pipes such that not every pipe of the plurality of pipes comprises a transceiver.

Example 24 is a method as in any of Examples 13-23, wherein transmitting the communication from the transceiver comprises transmitting an instruction from a controller configured to manage automated downhole drilling of an oil rig, wherein the communication causes one or more components of the oil rig to execute the instruction.

Example 25 is an apparatus including means to perform a method of any of Examples 1-24.

Example 26 is a machine-readable storage including machine-readable instructions, when executed, to implement a method or realize an apparatus of any of Examples 1-24.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A system comprising:
   a plurality of pipes connected end-to-end forming a pipe string, wherein each pipe of the plurality of pipes comprises:
      an exterior wall;
      an internal protective coating; and
      a waveguide;
   wherein the waveguide for each pipe of the plurality of pipes is connected to at least one other waveguide for at least one other pipe such that a wave path is formed that extends a length of the plurality of pipes; and
   a transceiver configured to transmit a signal along the wave path;
   wherein each pipe of the plurality of pipes further comprises a waveguide coupler configured to carry the signal along the wave path between a first pipe secured to a second pipe; and
   wherein each waveguide coupler comprises a spring metal sheet configured to conform to an interior cavity of a corresponding pipe without fully obstructing a flow of fluid through the corresponding pipe.

2. The system of claim 1, wherein the waveguide for each pipe of the plurality of pipes comprises an embedded waveguide attached to one or more of:
   an interior surface of the exterior wall of a corresponding pipe; or
   a surface of the internal protective coating of the corresponding pipe;
   wherein each embedded waveguide comprises a plated conductor.

3. The system of claim 2, wherein the waveguide for each pipe of the plurality of pipes comprises a spiral path such that mechanical relief is provided to the waveguide for each pipe of the plurality of pipes during bending or stretching of any of the plurality of pipes.

4. The system of claim 1, wherein the waveguide for each pipe of the plurality of pipes comprises surface waves propagating between a dielectric difference between the exterior wall and the internal protective coating of a corresponding pipe.

5. The system of claim 1, wherein each waveguide coupler of each of the plurality of pipes comprises a first waveguide coupler secured to a first end of a corresponding pipe and a second waveguide coupler secured to a second end of the corresponding pipe.

6. The system of claim 5, wherein a first waveguide coupler secured to a first end of a first pipe of the plurality of pipes makes contact with a second waveguide coupler secured to a second end of a second pipe of the plurality of pipes such that the wave path is not interrupted between the first pipe and the second pipe.

7. The system of claim 1, wherein each spring metal sheet further comprises one or more clamping ears configured to clamp the spring metal sheet to a surface of the interior cavity of the corresponding pipe and provide strain relief to the spring metal sheet against vertical and lateral forces.

8. The system of claim 1, wherein each spring metal sheet comprises a three-dimensional conical shape and is constructed of a flexible conductive material.

9. The system of claim 1, further comprising a transceiver housing configured to secure the transceiver to a pipe of the plurality of pipes.

10. The system of claim 9, further comprising a plurality of transceivers each configured to transmit and receive the signal along the wave path, wherein the plurality of transceivers are located intermittently along the plurality of pipes such that not every pipe of the plurality of pipes comprises a transceiver.

11. A method comprising:
   transmitting a signal from a transceiver;
   the transceiver configured to transmit the signal along a wave path extending a length of a plurality of pipes connected end-to-end, wherein each pipe of the plurality of pipes comprises:
      an exterior wall;
      an internal protective coating; and
      a waveguide;

wherein the waveguide for each pipe of the plurality of pipes is connected to at least one other waveguide for at least one other pipe such that the wave path extends the length of the plurality of pipes;

wherein each pipe of the plurality of pipes further comprises a waveguide coupler configured to carry the signal along the wave path between a first pipe secured to a second pipe; and wherein each waveguide coupler comprises a spring metal sheet configured to conform to an interior cavity of a corresponding pipe without fully obstructing a flow of fluid through the corresponding pipe.

12. The method of claim 11, wherein the waveguide for each pipe of the plurality of pipes comprises an embedded waveguide attached to one or more of:

an interior surface of the exterior wall of a corresponding pipe; or a surface of the internal protective coating of the corresponding pipe;

wherein each embedded waveguide comprises a plated conductor.

13. The method of claim 12, wherein the waveguide for each pipe of the plurality of pipes comprises a spiral path such that mechanical relief is provided to the waveguide for each pipe of the plurality of pipes during bending or stretching of any of the plurality of pipes.

14. The method of claim 11, wherein the waveguide for each pipe of the plurality of pipes comprises surface waves propagating between a dielectric difference between the exterior wall and the internal protective coating of a corresponding pipe.

15. The method of claim 11, wherein each waveguide coupler of each of the plurality of pipes comprises a first waveguide coupler secured to a first end of a corresponding pipe and a second waveguide coupler secured to a second end of the corresponding pipe.

16. The method of claim 15, wherein a first waveguide coupler secured to a first end of a first pipe of the plurality of pipes makes contact with a second waveguide coupler secured to a second end of a second pipe of the plurality of pipes such that the wave path is not interrupted between the first pipe and the second pipe.

17. The method of claim 11, wherein each spring metal sheet further comprises one or more clamping ears configured to clamp the spring metal sheet to a surface of the interior cavity of the corresponding pipe and provide strain relief to the spring metal sheet against vertical and lateral forces.

18. The method of claim 11, wherein each spring metal sheet comprises a three-dimensional conical shape and is constructed of a flexible conductive material.

19. The method of claim 11, wherein transmitting the signal from the transceiver comprises transmitting the signal through a plurality of transceivers each configured to transmit and receive the signal along the wave path, wherein the plurality of transceivers are located intermittently along the plurality of pipes such that not every pipe of the plurality of pipes comprises a transceiver.

20. The method of claim 11, wherein transmitting the signal from the transceiver comprises transmitting an instruction from a controller configured to manage automated downhole drilling of an oil rig, wherein the signal causes one or more components of the oil rig to execute the instruction.

* * * * *